(12) United States Patent
Ferdman et al.

(10) Patent No.: US 9,507,643 B2
(45) Date of Patent: Nov. 29, 2016

(54) TECHNIQUES FOR VIRTUALIZATION OF APPLICATION DELIVERY CONTROLLERS

(75) Inventors: Ilia Ferdman, Tel Aviv (IL); Amir Peles, Tel Aviv (IL); Uri Bechar, Tel Aviv (IL); Gil Shulman, Ramat Gan (IL); Giora Tenne, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 1099 days.

(21) Appl. No.: 13/405,816

(22) Filed: Feb. 27, 2012

(65) Prior Publication Data

US 2012/0226810 A1    Sep. 6, 2012

Related U.S. Application Data

(60) Provisional application No. 61/448,472, filed on Mar. 2, 2011.

(51) Int. Cl.
*G06F 15/173* (2006.01)
*G06F 9/50* (2006.01)

(52) U.S. Cl.
CPC .......... *G06F 9/5077* (2013.01); *G06F 9/5027* (2013.01)

(58) Field of Classification Search
None
See application file for complete search history.

(56) References Cited

U.S. PATENT DOCUMENTS 6,434,708 B1 *  8/2002  Dunnihoo et al. ............ 713/502
8,204,082 B2    6/2012  Jungck et al.
2007/0274321 A1 * 11/2007 Jonsson et al. .......... 370/395.53
2009/0319580 A1   12/2009 Lorenz et al.
2010/0284404 A1   11/2010 Gopinath et al.
2010/0332617 A1   12/2010 Goodwin et al.
2011/0138384 A1 *  6/2011 Bozek et al. .................... 718/1
2011/0149755 A1 *  6/2011 Gandhewar et al. ......... 370/252
2011/0280244 A1   11/2011 Gopinath et al.

OTHER PUBLICATIONS

NPL, Yang Yu et al., "A Feather-weight Virtual Machine for Windows Applications," Article in VEE Conference, Jun. 2006.*

* cited by examiner

*Primary Examiner* — Wing F Chan
*Assistant Examiner* — Padma Mundur
(74) *Attorney, Agent, or Firm* — M&B IP Analysts, LLC

(57) ABSTRACT

A virtualized application delivery controller (ADC) device operable in a communication network comprises a hardware infrastructure including at least a memory, a plurality of core processors, and a network interface; a plurality of instances of virtual ADCs (vADCs), the plurality of vADCs are executed over the hardware infrastructure, each of the plurality of vADCs utilizes a portion of hardware resources of the hardware infrastructure, the portion of hardware resources are determined by at least one ADC capacity unit allocated for each of the plurality of the vADCs; a management module for at least creating the plurality of instances of the vADCs; and a traffic distributor for distributing incoming traffic to one of the plurality of vADCs and scheduling execution of the plurality of vADCs on the plurality of core processors, wherein each of the plurality of vADCs is independently executed on at least one of the plurality of core processors.

27 Claims, 6 Drawing Sheets

| TS1 | TS2 | TS3 | TS4 | TS5 | TS6 | TS0 | TS7 | TS8 | TS9 | TS10 | TS11 | TS12 |
|---|---|---|---|---|---|---|---|---|---|---|---|---|
| vADC | vADC | vADC | vADC | vADC | vADC | TD | vADC | vADC | vADC | vADC | vADC | vADC |
| 611 | 611 | 611 | 612 | 612 | 613 | 140 | 611 | 611 | 611 | 612 | 612 | 613 |

TECHNIQUES FOR VIRTUALIZATION OF APPLICATION DELIVERY CONTROLLERS

CROSS REFERENCE TO RELATED APPLICATIONS

This application claims the benefit of U.S. provisional application No. 61/448,472 filed on Mar. 2, 2011, the contents of which are herein incorporated by reference.

TECHNICAL FIELD

This invention generally relates to virtualizations of application delivery controllers (ADCs).

BACKGROUND

An application delivery controller (ADC) is a network device installed in a datacenter or multi-datacenter system to remove load from web servers in the datacenter. That is, an ADC typically distributes clients' requests between the web servers in a datacenter to balance the load. In a multi-datacenter system, an ADC is deployed in each datacenter to redirect clients' requests to a datacenter that would best serve such requests. Typically, the redirection decision is based on the location of the client from the datacenter. The ADC is a network device and, as such, includes computing resources, such as memory, one or more central processing units (CPU), storage, network connectivity, and so on.

A virtual machine (VM) is a software implementation of a computer that executes programs like a physical machine. The virtualization technology decouples the hardware from software, thus allows sharing of the underlying physical hardware resources between different virtual machines, each running its own operating system (guest). Thus, the virtualization, which is typically performed by a hypervisor, allows multiple operating systems to run concurrently on a host computer. The hypervisor presents the guest operating systems with a virtual operating platform and monitors the execution of the guest operating systems. Further, the hypervisor defines the allocation of resources (e.g., CPU power, memory, network bandwidth, etc.) for each guest operating system.

Virtualization of an ADC device can improve the performance of datacenters and reduce costs and overhead to the service providers. Similar to any other data center application, the ADC devices of different customers or applications can be consolidated as multiple virtual ADC instances running on a single hardware device. A straightforward approach to achieve this process would be to run a conventional hypervisor to control one or more ADC virtual machines. However, conventional hypervisors are primarily designed to support virtualization of general purpose computing devices, e.g., servers, and not network devices, such as ADCs. Network elements are measured by their high forwarding capacity and low latency, unlike server applications that are measured by their capacity of CPU intensive task processing. For example, conventional virtualization solutions cannot guarantee low latency when processing data packets, and further, their throughput and capacity is limited as only a small number of virtual machines can be executed on a physical computing device.

Therefore, the straightforward and conventional virtualization solutions are not optimized to support virtualization of ADCs.

SUMMARY

Certain embodiments disclosed herein include a virtualized application delivery controller (ADC) device operable in a communication network. The virtualized ADC comprises a hardware infrastructure including at least a memory, a plurality of core processors, and a network interface; a plurality of instances of virtual ADCs (vADCs), the plurality of vADCs are executed over the hardware infrastructure, each of the plurality of vADCs utilizes a portion of hardware resources of the hardware infrastructure, the portion of hardware resources are determined by at least one ADC capacity unit allocated for each of the plurality of the vADCs; a management module for at least creating the plurality of instances of the vADCs; and a traffic distributor for distributing incoming traffic to one of the plurality of vADCs and scheduling execution of the plurality of vADCs on the plurality of core processors, wherein each of the plurality of vADCs is independently executed on at least one of the plurality of core processors.

Certain embodiments disclosed herein also include a method for visualizing an application delivery controller. The method comprises instancing a plurality of virtual application delivery controllers (vADCs), the plurality of vADCs are executed over a hardware infrastructure of a computing device, the hardware infrastructure includes at least a memory, a plurality of core processors, and a network interface, wherein each of the plurality of vADCs utilizes a portion of hardware resources of the hardware infrastructure, the portion of hardware resources are determined by at least one ADC capacity unit allocated for each of the plurality of the vADCs; distributing incoming traffic to the plurality of vADCs; and scheduling execution of the plurality of vADCs on the plurality of core processors, wherein each of the plurality of vADCs is independently executed on at least one of the plurality of core processors.

Certain embodiments disclosed herein also include a system configured to provide virtualized application delivery control services. The system comprises a plurality of blade servers, each of the plurality of blade servers includes a hardware interface having at least a plurality of core processors, a memory, and a network interface, wherein each of the plurality of blade servers is configured to create a plurality of virtual application delivery controllers (vADCs), the plurality of vADCs are executed over the hardware infrastructure of the blade server, wherein each of the plurality of vADCs utilizes a portion of hardware resources of the hardware infrastructure of its respective blade server, the portion of hardware resources are determined by at least one ADC capacity unit allocated for each of the plurality of the vADCs; and a switch connected to the plurality blade servers, wherein the switch is configured to distribute an incoming traffic to one of the plurality of blade servers for processing by one of the vADCs executed thereon.

BRIEF DESCRIPTION OF THE DRAWINGS

Various embodiments are particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION

Figure 1:
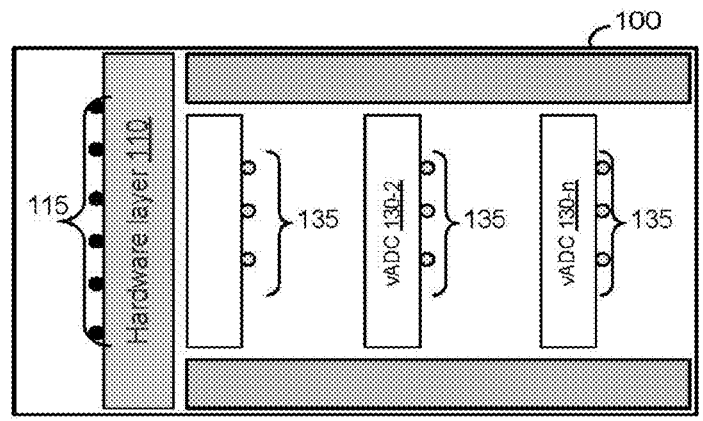
FIG. 1 is a block diagram of a virtualized ADC device according to an embodiment of the invention.

The embodiments disclosed herein are only examples of the many possible advantageous uses and implementations of the innovative teachings presented herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

FIG. 1 is an exemplary and non-limiting diagram illustrating the architecture of a virtualized ADC device 100. According to the techniques disclosed herein a virtualized ADC device is a physical computing device that can execute a plurality of instances of virtual ADCs (hereinafter vADC). The physical computing device may include, for example, a server, a blade server, a blade system, a multi-device system, and a network device, such as a load balancer, an application delivery controller, and the like.

As illustrated in FIG. 1, the virtualized ADC device 100 includes a hardware layer 110 that comprises the computing resources of the device 100. The computing resources include, but are not limited to, one or more central processing units (CPUs), each CPU having one or more processing cores, a system memory, a storage disk, a system board, a memory management unit, registers, network ports, and so on. A single operating system (OS) is executed over the hardware layer 110. The OS may be, but is not limited to, a Windows-based operating system, a Linux based operating system, a UNIX based operating system, VXwork6, and the like.

The computing resources of the hardware layer 110 are managed by a management module 120. Specifically, the management module 120 sets the various components of the hardware layer 110, defines network parameters and addresses, supervises the allocation of device resources, and creates and halts vADC processes. A user (e.g., a system administrator) can access the management module 120 using, for example, a Web-based application, a SNMP-based application, a command-line interface (CLI), web services API, and the like.

In the virtualized ADC device 100, one or more vADCs 130-1 through 130-n are created and executed. Each of the vADC 130-1 through 130-n is a process that acts logically as a physical ADC device. That is, each vADC 130-i (i=1,2, . . . , n) performs the tasks of a physical ADC device. These tasks include, but are not limited to, load balancing of traffic, traffic acceleration, traffic compression, traffic caching, SSL offloading, and so on. Each vADC 130-i has a separate networking configuration, a MAC address, and an application delivery configuration. It should be noted that a vADC 130-i process does not execute its own guest operating system, as conventionally performed by virtual machines. The traffic distributor 140 directs incoming traffic to one or more of the vADCs 130 and routes traffic between the vADCs 130. The traffic distributor 140 also schedules the execution of the vADC on the CPU cores of the device 100.

In accordance with an embodiment, the management module 120, vADCs 130, and traffic distributor 140, communicate using a virtualization communication protocol (VCP). The VCP provides software independently of the vADCs 130-1 through 130-n from the underling hardware layer 110 and its operating system. This allows independently executing multiple vADCs 130-1 through 130-n, where each vADC may be of a different version and execution logic. As a result, service providers can choose which process version and which vADC to run. The service providers can also choose which vADC to upgrade, thus enabling partial system upgrades (software upgrade). It should be appreciated that a partial system upgrade minimizes the risks of introducing new software versions and reduces the overall downtime of a datacenter.

Each of the plurality of vADCs 130 is independently managed. That is, each vADC manages its own configuration, user privileges, alerts, and reports. This allows, for example, setting different privileges to different vADCs running on a virtualized vADC device.

Figure 2:
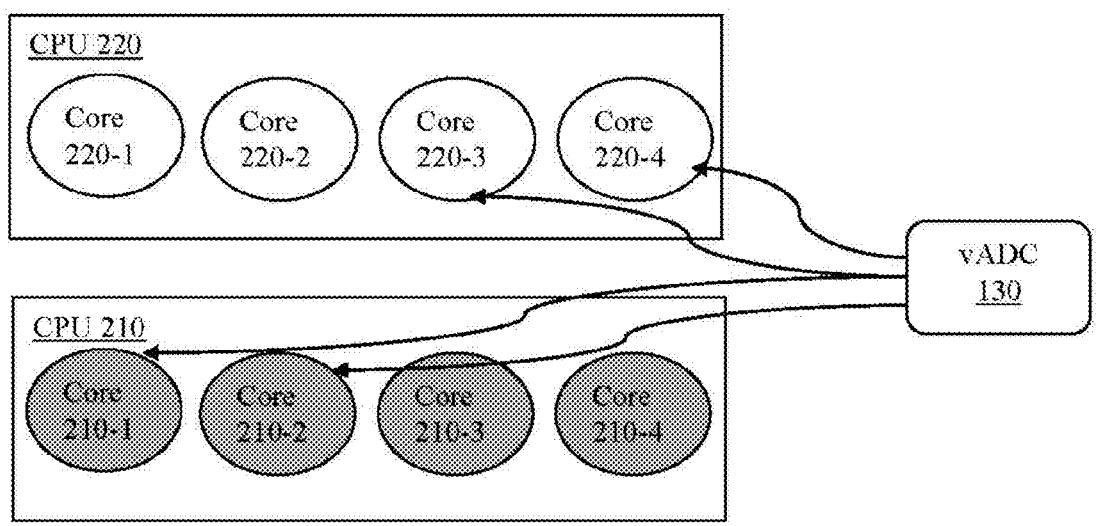
FIG. 2 is a diagram illustrating the execution of a vADC on multiple cores.

In accordance with an embodiment, a vADC can be executed on a single core, a part of a core, or multiple cores of one or more CPUs. As illustrated in FIG. 2, each of CPUs 210 and 220 includes 4 cores, 210-1 through 210-4 and 220-1 through 220-4. The CPUs are part of the hardware layer of the virtualized ADC device. A vADC 130-i can run on any combination of cores 210-1 through 210-4 and 220-1 through 220-4. In the example shown in FIG. 2, a vADC 130 runs on cores 210-1 and 210-2 of the CPU 210 as well as cores 220-3 and 220-4 of the CPU 220. The selection of CPU cores is described in detail below.

Referring back to FIG. 1, a vADC 130-i is exposed to the network as a separate network device with its own set of virtual internal ports 135. However, data traffic of a vADC 130-i is actually sent and received through the physical external ports 115 of the virtualized ADC device 100. Each virtual internal port 135 is set with a unique media access control (MAC) address. The number of virtual internal ports 135 assigned to each vADC 130 is bounded by the number of external ports 115. That is, the number of virtual internal ports 135 of a vADC 130-i cannot exceed the number of the external ports 115.

In accordance with certain embodiments, association between internal ports and external ports may be performed using either a dedicated port topology or shared port topology. The dedicated port topology assumes full network infrastructure separation between vADCs 130 running on the same virtualized ADC device 100. That is, a specific external port 115 is associated with an internal port 135 of a single specific vADC 130. In a shared port topology, two or more different vADCs 130-1 through 130-n can share the same external port 115, where traffic separation is performed according to VLAN association and destination MAC addresses.

The traffic which flows within the virtualized ADC device 100 can be logically divided into two groups: external traffic, i.e., traffic received through the external ports 115 and internal traffic, i.e., traffic generated by the virtualized ADC's components, i.e., the vADCs 130, the management module 120, the hardware layer 110, the traffic distributor 140, and so on. Primarily, external traffic should be load-balanced. The internal traffic carries configuration updates, event notification, and statistical information.

Incoming external traffic, received through one of the external ports 115, is sent to one of the vADCs 130 selected by the traffic distributor 140. Specifically, first, a packet arrives to the virtualized ADC device 100, through one or more external ports 115, and is processed by the hardware layer 110 (e.g., an Ethernet MAC controller). Then, processed packets are sent to the traffic distributor 140 that selects a vADC 130-i for processing the packets according to one or more of the VLAN tags, MAC addresses, or any other layer-2 parameters designated in the packets and a vADC selection process. The traffic distributor 140 may also select between one or more cores (either physical or logical CPU cores) within the selected vADC 130 based, in part, on layer 3 or layer 4 (TCP/IP) parameters of the OSI model. The vADC selection process is described in detail below.

The traffic distributor 140 also checks if an incoming packet should be cloned and sent to multiple destinations. For example, if an incoming packet is a broadcast packet or with an unknown destination MAC address, the traffic distributor 140 clones the packet and sends copies of the same packet, to multiple vADCs 130 on the same layer 2 VLAN that the packet arrived from. Finally, packets received at a vADC 130-i (i=1, 2, ..., n) are processed to perform the tasks defined for the vADC 130-i. Such tasks may include, for example, distributing packets between web servers or any other ADC's functions.

In the transmit direction, packets processed by a vADC 130-i are returned to the traffic distributor 140, which determines the final destination of each outgoing packet. Packets that should be sent outside of the virtualized ADC device 100 are forwarded to the hardware layer 110 which transmits the packets through the external ports 115 to its destination. The destination external port is determined according to, for example, layer-2 parameters (e.g., destination MAC address) of the packets or any other indicator. Packets can also be sent from a vADC 130-i to an internal destination port or ports for processing by other vADC or vADCs 130-i. The processes for traffic distribution from/to vADCs and between vADCs are described below with reference to FIGS. 7 and 8.

Figure 3:
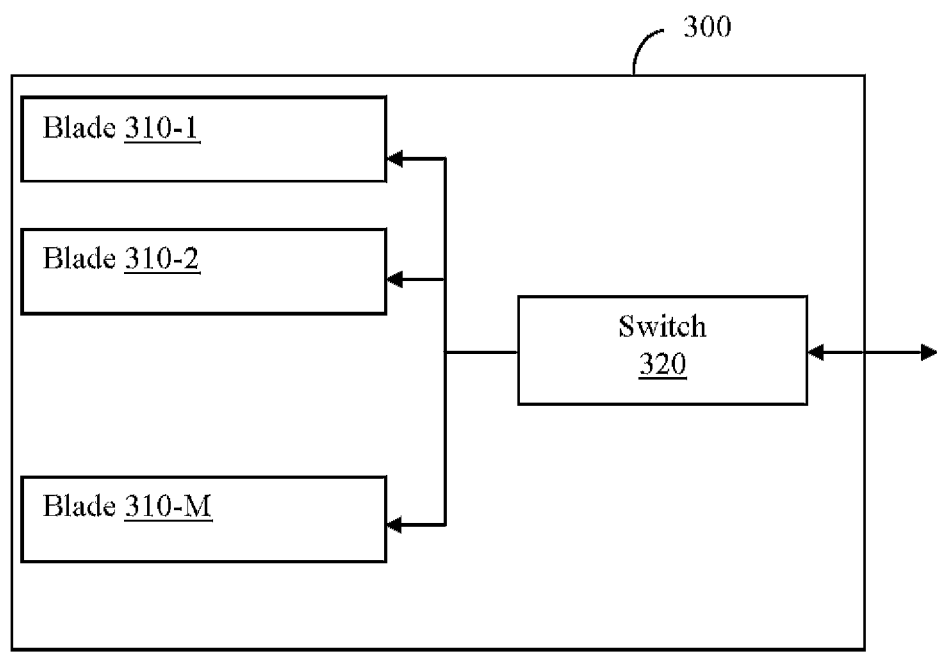
FIG. 3 is a diagram of a multi-blade system utilized to describe an embodiment of the invention.

FIG. 3 schematically illustrates a multi-blade system 300 that includes a plurality of blade servers 310-1 through 310-M and a switch 320. According to certain embodiments of the invention, vADCs can be executed on the multi-blade system 300. The switch 320 determines to which blade server 310-j (j=1, 2, ..., M) to distribute incoming traffic. In accordance with one embodiment, ADC virtualization may be performed on a set of blade servers including one or more of the blade servers 310-1 through 310-M, where the switch 320 participates in the functionality of the traffic distributor 140. This embodiment allows executing several virtualized ADC devices in parallel, to execute a single virtualized ADC device on several blade servers 310-1 through 310-M, or combinations thereof. Thus, a vADC can be executed in parallel on different blade servers 310-1 through 310-M. It should be noted that a vADC 130-i can be executed on different core processors of different servers 310-1 through 310-M.

As a non-limiting embodiment, each of the blade servers 310-1 through 310-M acts as a virtualized ADC device, such as the device 100 illustrated in FIG. 1. In such an embodiment, the switch 120 selects to which of the blade servers (e.g., to server 310-2) to distribute an incoming traffic. The blade server receiving the incoming traffic forwards it to one of its vADC instances by means of its traffic distributor. The switch 120 selects the destination blade server based on one or more of the VLAN tags, MAC addresses, or any other layer-2 parameters designated in the incoming packets. In an embodiment, the switch 320 performs a selection process described in detail below with a reference to FIG. 4.

In accordance with various embodiments disclosed herein, computing resources allocated for a vADC 130-i are defined in terms of an ADC capacity unit (ADC-CU). An ADC capacity unit is an atomic, not dividable, block that encapsulates various computing resource parameters. The computing resource parameters include, but are not limited to, computation resources, memory resources, a number of concurrent allowable connections, a number of new connections per second, a configuration limit, a network bandwidth, storage resources, secure sockets layer (SSL) hardware processing resources, and compression hardware processing resources. The parameters may be related to computing resources that are internal and/or external to the virtualized ADC device performing the virtualization.

A virtualized ADC device can serve one or more ADC capacity units. With this aim, the computing resources of the device or array of devices (e.g., a multi-blade system) are equally divided into the number of ADC capacity units that can be supported by the device. One or more ADC capacity units can be allocated to a vADC.

The computation resources parameter defines the number of CPU cores and parts of cores that can run a vADC 130-i. The percentage of memory resources defines an amount of memory in bytes to be allocated per vADC 130-i. The percentage of total device bandwidth defines the percentage of total device bandwidth allocated for a vADC 130-i. If this limit is exceeded on a vADC 130-i, the packet may be dropped. The percentage of storage devices parameter defines an amount of storage space in Mbytes that are available for a vADC 130-i. This parameter includes several values for each system storage device. The concurrent connection limit parameter defines a maximal number of sessions that a vADC 130-i can handle in parallel. The configuration limit defines a maximal number of VIPs, servers, and proxy IPs that can be configured per vADC. The percentage of secure sockets layer (SSL) capabilities defines the number of new SSL connections that a vADC 130-i is allowed to process. The percentage of compression hardware capabilities parameter defines the amount of bytes that a vADC 130-i is allowed to compress/decompress. The percentage of HTTP object caching memory resources defines the number of bytes that a vADC 130-i is allowed to store in caching memory.

It should be noted that the number of ADC capacity units and percentage of system resources allocated for each ADC capacity unit may vary from one virtualized ADC device (or a multi-blade system) to another, depending on the virtualized ADC device and its hardware configuration. For example, the amount of memory allocated for each ADC capacity unit depends on the amount of memory included in a particular device, the number of CPU cores, and so on. A virtualized ADC device 100 may offer one or more ADC capacity unit configurations for a selection by a user. For example, one configuration of the device offers a small number of large ADC capacity units, and a second configuration of the device offers a larger number of small ADC capacity units. This allows the user of a device 100 to upgrade or downgrade the utilization of the computing resources, on-demand. It should be appreciated that the multiple configurations ADC capacity units for a virtualized ADC device 100 is beneficial in "cloud computing applications" where the utilization of resources is dynamically changed. According to one embodiment, each ADC capacity unit configuration may be associated with a different price.

A maximum of allowable ADC capacity units ($CU_{MAX}$) for the virtualized ADC device are set, for example, by a system administrator. An ADC capacity unit is defined to include a $CU_{MAX}$-portion of each resource parameter defined above. That is, a capacity unit may be defined as follows:

$$CU=\{SP\_C\#/CU_{MAX}; MEM/CU_{MAX}; BW/CU_{MAX};\\ CONN./CU_{MAX}; cVIP, cRS, cPIP, STOR/\\ CU_{MAX}; SSL/CU_{MAX}; CMP/CU_{MAX}\}$$

where "SP_C#" is the number of available CPU cores, "BW" is the system maximal theoretical throughput, "MEM" is the amount of available memory, "CONN" is the maximal number of concurrent connections for the vADC 130-i to handle at each point of time, "STOR" is the free space on storage device(s) available for applications' execution, "SSL" is a SSL HW capacity to open new SSL connections, "CMP" is compression HW throughput capacity to process incoming byte stream, and cVIP, cRS, cPIP is a maximum number of VIPs, real servers and proxy IP, respectively, that totally should be supported per capacity unit (these numbers are defined by a system administrator).

Figure 4:
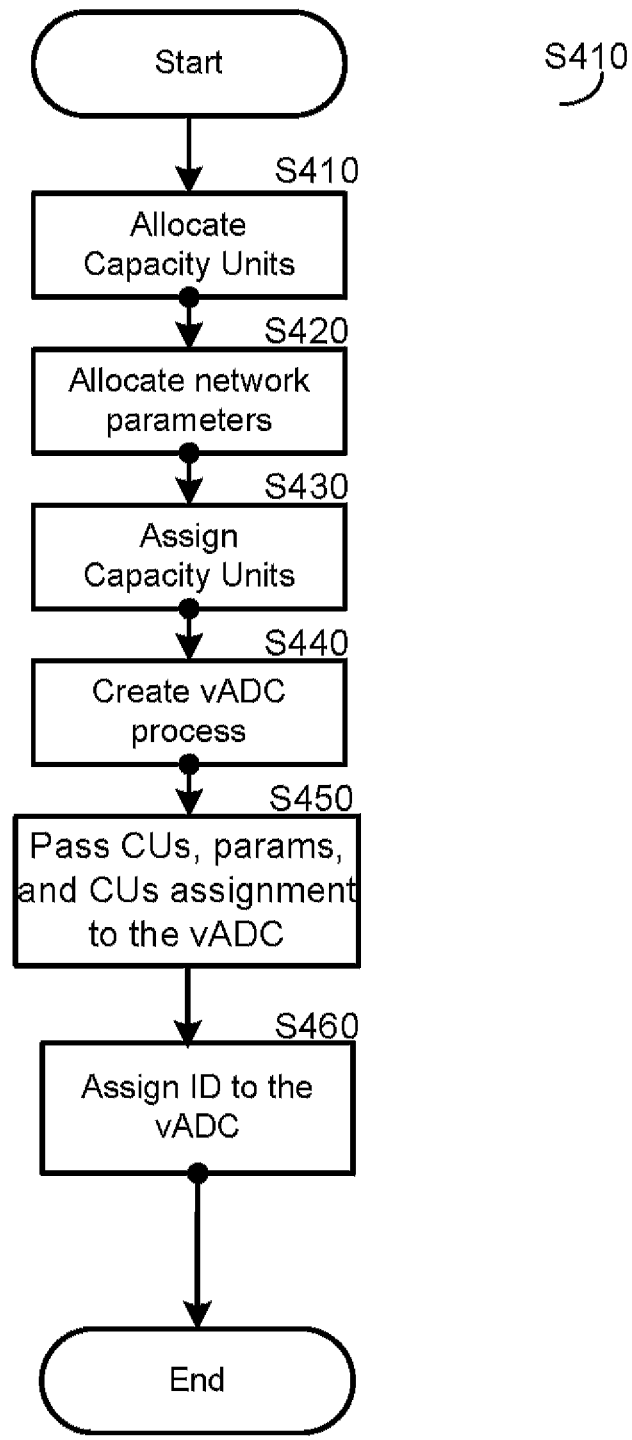
FIG. 4 is a flowchart illustrating the process for creating a vADC according to an embodiment of the invention.

FIG. 4 is a non-limiting flowchart 400 illustrating a process for creating a vADC in accordance with an embodiment. As mentioned above, a vADC provides the functionality of a physical ADC device deployed in a datacenter. The creation of vADCs is controlled by the management module 120. In an embodiment, the creation of vADC 130-i initializes a vADV instance in the device 100. As mentioned above, multiple vADV instances can reside and operate in parallel in the device 100.

At S410, the management module 120 tries to allocate the number of ADC capacity units requested by a user (e.g., a system administrator) for a newly created vADC. At S420, network parameters, such as a MAC address and a management IP address, are allocated for a vADC to be created.

At S430, the allocated ADC capacity unit(s) is assigned to a vADC. Specifically, S430 includes selection of CPU cores, or portions thereof, and memory for executing the newly created vADC. In accordance with an embodiment, such selection is performed to achieve a balanced system by minimizing the difference in the number of ADC capacity units running on every CPU core. The balance is reached by dispersing vADCs across CPU cores. In another embodiment, the selection tries to minimize latency impact caused by executing several vADCs on the same core, by assigning a CPU core to a single vADC. Step S430 will be now described in more details with reference to FIG. 5.

Figures 5, 6:
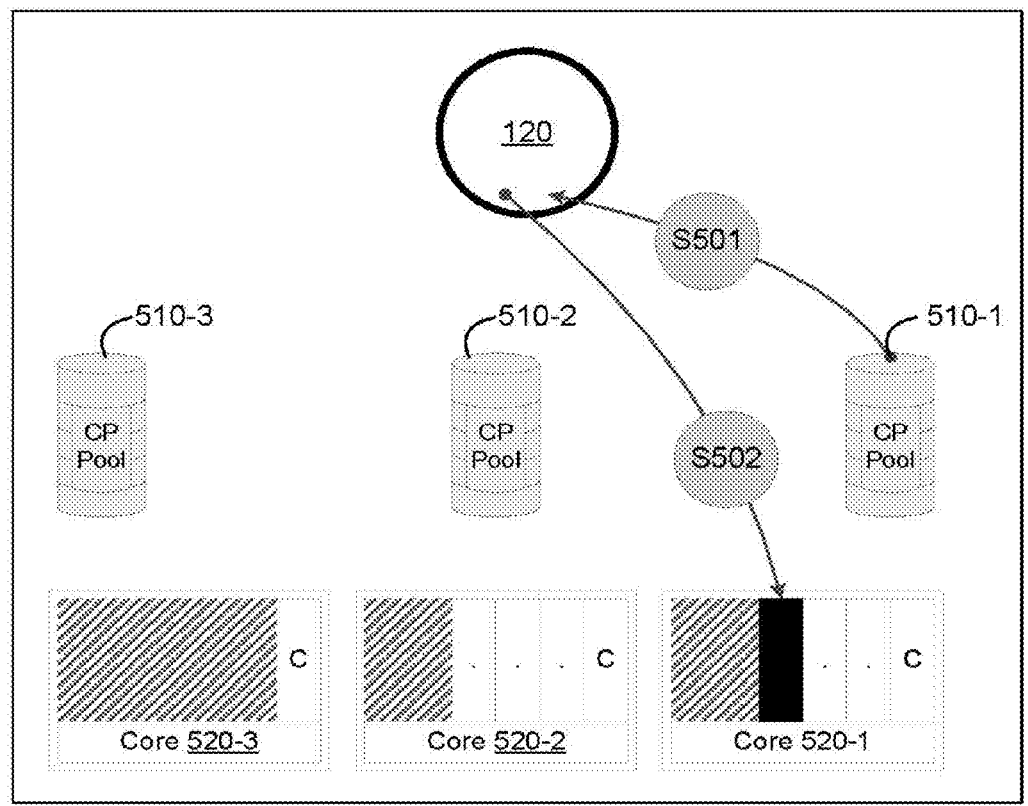
FIG. 5 is a diagram illustrating the process of allocating ADC capacity units to a created vADC.
FIG. 6 is a diagram illustrating the scheduling process according to an embodiment of the invention.

In a virtualized ADC device 100, every CPU core and memory attached to this core are initially divided into a predefined number of capacity partitions (CP). The dimension parameters of capacity partitions (core percentage and memory size) will be equal to the computation resources, and memory resources parameters in the ADC capacity units. The number of capacity partitions coexisting in the device 100 should be equal to the number of the maximum ADC capacity units, one partition for every ADC capacity unit. A list of capacity partitions available for allocation on a specific core is maintained in virtual pools 510 of free capacity partitions, one virtual pool 510 for every CPU core 520. As depicted in FIG. 5, there are 3 virtual pools 510-1, 510-2, and 510-3 for 3 CPU cores 520-1, 520-2, and 520-3.

The allocation of the requested ADC capacity units to the created vADC includes selecting on which CPU core or cores and from which memory the newly created vADC will run. At S501, allocation of capacity partitions from the respective virtual pool 510 of the selected core 520 is performed. This allows for reserving, on the selected core, a percentage of computation resources and an amount of memory. Then, at S502, the CPU core (e.g., 520-2), or cores selected to run, is instructed to behave in accordance to new resource reservation. In an embodiment, the allocation is performed by the management module 120.

Referring back to FIG. 4, at S440, an instantiation of a vADC (e.g., vADC 130-i) takes place. At S450, the network parameters, ADC capacity unit allocation as well as the assignment information, are passed to the created vADC. At S460, a unique identification (ID) number is assigned to the vADC. The ID number may be utilized, for example, to communicate with the vADC.

In accordance with an embodiment of the invention, ADC capacity units allocated and assigned to a created vADC can be modified during the runtime of the vADC. That is, one or more ADC capacity units may be added or de-allocated from a running vADC, without halting the vADC. In another embodiment, a vADC can be migrated from one virtualized ADC device to another. As mentioned above, each virtualized ADC device is characterized with different computing resources, thus when migrating vADCs between devices, allocated ADC capacity units are converted accordingly.

Further, a created instance of a vADC can be deleted when it is no longer required. The process for deleting a vADC instance can be initiated by the system administrator. The process includes destroying the vADC running one or more CPU cores, and de-allocating the networking parameters, ADC capacity units, and reserved computing resources.

In order to allow low latency of packets processing the vADCs 130 and to ensure that every vADC 130-i can fully utilize the CPU resources allocated by its ADC capacity unit(s), a scheduling process is implemented by the traffic distributor 140. The scheduling process schedules between several vADCs 130-1 through 130-n sharing the same CPU core. vADCs running on different CPU cores process packets independently, thus scheduling between such vADCs is not required.

In accordance with an embodiment, a time slice which is the minimum time window that a vADC 130-i can receive for utilizing a CPU core is set to an initial value. In an exemplary embodiment, the time slice is set to 25 microseconds.

Then, for each vADC to be executed on a CPU core, the process allows the execution of the vADC during a consecutive number of time slices equal to the number of ADC capacity units for that vADC on that core. Once a vADC consumes its time slice or slices, the scheduling process provides execution time for the next vADC in line. The scheduling between vADCs may be performed in a round-robin manner or any other scheduling algorithm. In an embodiment, the scheduling process ensures a particular vADC 130-i does not wait more than a predefined time period to receive execution time on a CPU core. This waiting time period determines the latency of the processing tasks by a vADC 130-1, and thus the latency of the virtualized ADC device. It should be appreciated that the latency is configurable, and hence can be set to optimally serve network processing tasks performed by the vADC.

An example for the scheduling process is provided in FIG. 6, where 3 vADCs 611, 612, and 613 are executed on a single CPU core. The ADC capacity units allocated for vADCs 611, 612, and 613 are 3, 2, and 1 respectively. As can be noticed, vADC 611 is executed during time slices TS1, TS2, TS3, and TS7, TSB, TS9; vADC 612 runs at time slices TS4, TS5 and TS10, TS11; and the vADC 613 is executed during time slices TS6 and TS12. The time slice TS0 is reserved for the traffic distributor (TD 140).

In the example provided in FIG. 6, the maximum latency is 7 time slices. For example, in the worst case scenario illustrated in FIG. 6, the vADC 613 waits 6 time slices until it can be executed on a CPU core. The best case shown in FIG. 6 is for vADC 611 that waits only 4 time slices for its execution.

In accordance with an embodiment, during its execution a vADC can borrow additional resources. This feature allows for the efficient processing of burst traffic. To this end, a pool of resources (e.g., a pool 510-3 in FIG. 5) is reserved during the initialization of the virtualized ADC device 100. Then, during a runtime of a vADC 130-i, additional resources can be temporarily allocated for a configurable limited time period.

In an embodiment, to prevent extensive usage of the reserved pool, statistics are collected about the utilization of the pool of resources by each vADC 130-i. vADCs that exceed an allowed quota to borrow are blocked from consumption of the reserved resources and their allocated ADC capacity units may be permanently increased. In certain embodiments, statistics collected on the utilization of ADC capacity units and reserved resources can be reported to the user. Using such information the user may decide to increase/decrease the number of ADC capacity units for a vADC or the number of vADCs executed in the device 100.

Figure 7:
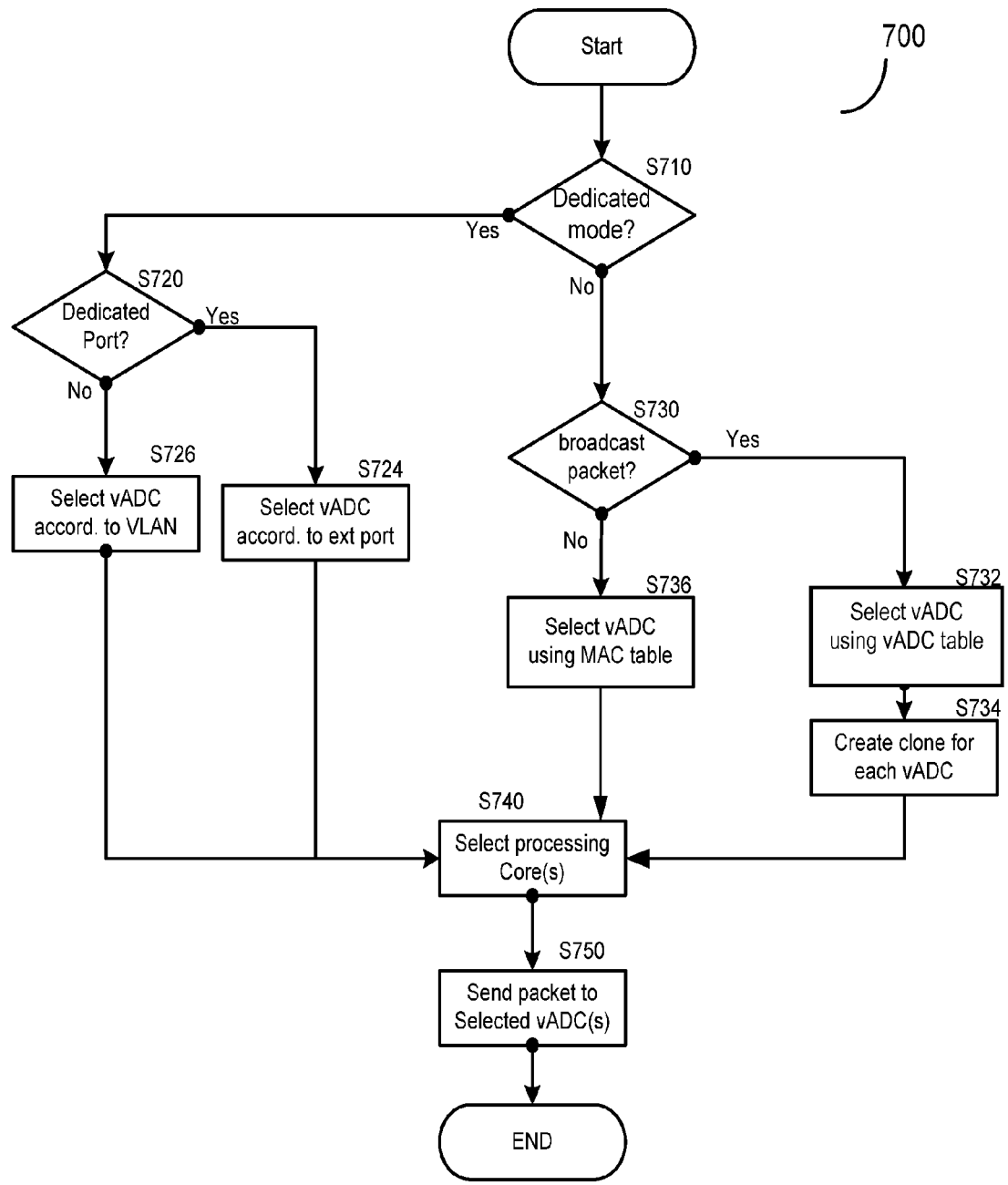
FIG. 7 is a flowchart illustrating a vADC selection process performed according to an embodiment of the invention.

FIG. 7 shows a non-limiting flowchart 700 illustrating the vADC selection process performed by the traffic distributor 140, upon reception of a packet, according to an embodiment. Through the selection process, the traffic distributor 140 determines which of the vADC 130-1 through vADC 130-n an incoming traffic should be forwarded to for processing.

As mentioned above, an association between internal ports and external ports may be performed using either a dedicated port topology or shared port topology. The dedicated port topology assumes full network infrastructure separation between vADCs 130 running on the same virtualized ADC device 100. In a shared port topology, two or more different vADCs 130 can share the same external port 115, where traffic separation is performed according to VLAN association and destination MAC addresses.

At S710, a check is made to determine whether the external port 115 on which an incoming packet was received employs a dedicated topology (mode), and if so, execution continues with S720; otherwise, a shared topology is employed and execution advances to S730.

At S720, another check is made to determine if the external port 115 is bound to a specific vADC 130. The check may be performed based on layer-1 parameters (e.g., layer-1 port setting and port aggregation) of the incoming packet. If S720 results in an affirmative answer, at S724, the vADC to process the incoming packet is selected using an input external port number. Then, execution advances to S740.

If S720 results with a negative answer, at S726, the vADC to process the incoming packet is selected by matching a VLAN tag embedded in the packets to the VLAN-to-vADC translation table, which returns a vADC based on a VLAN tag in the packet. It should be noted that S726 is performed for all types of packets, e.g., broadcast and unicast packets. It should be further noted that if there is no match of a VLAN tag to vADC, the packet is dropped and execution returns an error message.

At S730, it is checked if the packet destination MAC address is a broadcast MAC address, and if so, at S732, the vADC is selected using the VLAN-to-vADC translation table. It should be noted that in this case, multiple vADCs can be returned when matching a single input VLAN tag. At S734, the packet is cloned as the number of vADCs returned at S732. Thereafter, execution continues with S740. If S730 returns a negative answer, the packet is a unicast packet, and at S736, the VLAN tag and destination MAC address are matched against a MAC translation table, which returns a single vADC to process the incoming packet. It should be noted that if the packet includes an unknown destination MAC address, the packet is dropped and an error message is generated. The translation tables mentioned above are preconfigured or can be configured during vADC creation and can be modified by a user (e.g., a system administrator).

At S740, the traffic distributor 140 has to select one of the one or more CPU cores belonging to the selected vADC for the execution of the packet processing. In one embodiment, the selection of the CPU core is based on any of the layer-2, layer-3, and layer-4 headers of the received packet. As an example, a CPU core may be selected by calculating a hash value of the layer-3 or layer-4 headers of the packet. Using the computed hash value, the CPU core(s) is selected for the vADC by considering that on different cores the vADC can use different core share. If the layer-3 (IP) or layer-4 (TCP) parameters are unknown or the packet is not an IP packet, the packet is sent to a pre-defined core (e.g. core 0). Other embodiments based on functions and distribution policies to select the CPU core(s) for the vADC will be apparent to one of ordinary skill.

At S750, the packet is sent to the selected vADC and CPU core. It should be noted that layer-1, layer-2, layer-3, and layer-4 mentioned herein refer to the layer-1, layer-2, layer-3 and layer-4 defined in the OSI model, i.e., the physical, MAC and TCP/IP layers. It should be noted that when a broadcast packet should be sent to more than one vADC, S740 and S750 are repeated per each vADC.

Figure 8:
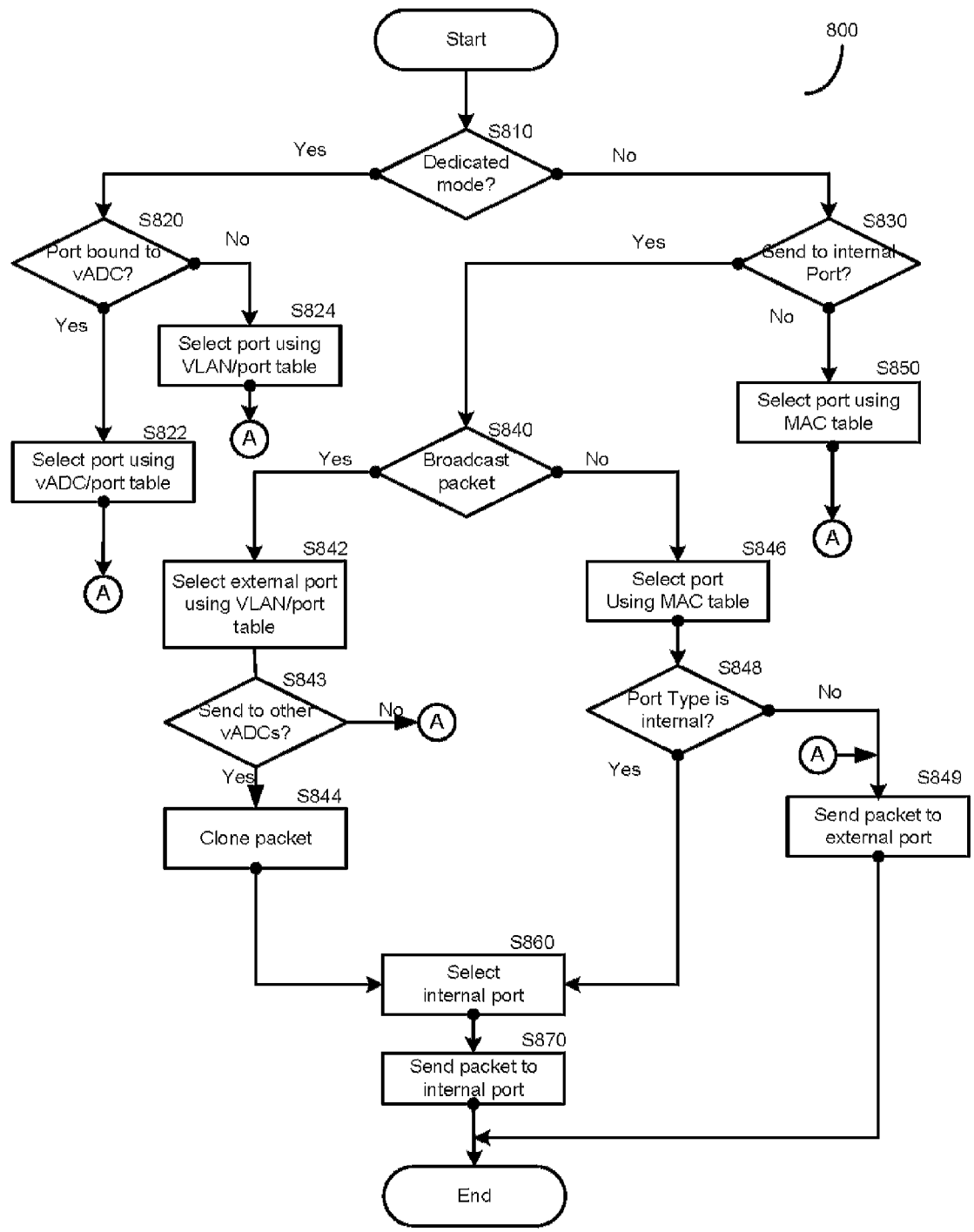
FIG. 8 is a flowchart illustrating the process for routing packets processed by a vADC according to an embodiment of the invention.

FIG. 8 shows a non-limiting and exemplary flowchart 800 illustrating a process for routing packets processed by a vADC, as performed by the traffic distributor 140, according to one embodiment. At S810, it is checked if the external port on which an original packet was received employs a dedicated topology (mode). If so, execution continues with S820; otherwise, a shared topology is employed and execution advances to S830.

At S820, another check is made to determine if an internal port of a vADC that outputs the packet is bounded to a specific external port 115. The check may be performed based on the layer-1 and/or layer-2 parameters (e.g., VLAN tag) designated in the packet. If S820 results with an affirmative answer, at S822, the external port for the packet is selected using a vADC-to-port translation table, which returns a port number of an external port (port 115 FIG. 1) to send the packet. Then, execution continues with S849. If S820 results in a negative answer, at S824, the external port 115 which sends out the packet is selected using a VLAN-to-port translation table, which returns a single port number, based on the VLAN tag in the packet. Then, execution continues with S849.

At S830, it is checked if the packet transmission between vADCs is allowed. If so, at S840, it is further checked if the packet's destination MAC address is a broadcast MAC address. If so, at S842, the external port is selected using the VLAN-to-port translation table. Then, at S843, the VLAN tag of the packet is matched against the VLAN-to-vADC translation table to determine if the packet should be sent to other vADCs, and if so, which one. At S844, the packet is cloned as the number of vADCs matching the VLAN tag. Then, execution continues with S860.

If S840 returns a negative answer, the packet is a unicast packet, and at S846, the destination MAC address is searched in a MAC translation table, which returns a destination port (which may be either internal or external) according to the input MAC address. At S848, it is checked if the type of the port is an internal, and if so, execution continues with S860; otherwise at S849, the packet is sent to the external port.

At S860, a destination internal port is selected based, in part, on the destination IP address of the packet. At S870, the packet is sent to the vADC with the selected internal port.

If S830 results with a negative answer, execution continues with S850 where the destination MAC address of the packet is searched in a MAC translation table, which returns a destination external port according to the input destination MAC address. Then, the packet is sent to the external port. The translation tables mentioned above, with reference to flowchart 800, are preconfigured and can be modified by a user (e.g., a system administrator).

In an embodiment, reception and transmission of packets is performed using a zero copy mechanism implemented by the traffic distributor 140. This mechanism allows packet reception and transmission from/to external interfaces and packet switching between vADC's, without transferring the packets among the virtualized ADC device, and cloning or copying of the packets. With this aim, the packets are saved in a shared memory that can be accessed by the vADCs 130 and traffic distributor 140. Thus, instead of, for example, cloning a packet, a pointer to a shared memory is provided to each vADC that should process the packets.

The foregoing detailed description has set forth a few of the many forms that the invention can take. It is intended that the foregoing detailed description be understood as an illustration of selected forms that the invention can take and not as a limitation to the definition of the invention.

Most preferably, the various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

What is claimed is:

1. A virtualized application delivery controller (ADC) device operable in a communication network, comprising:
   a hardware infrastructure including at least a memory, a plurality of core processors, and a network interface;
   the hardware infrastructure being configured so that, when operating, the hardware infrastructure is configured to:
   create a plurality of instances of virtual ADCs (vADCs), each of the plurality of vADCs being allocated a portion of hardware resources provided by the hardware infrastructure, the portion of the hardware resources allocated to each respective vADC being an integral multiple of an ADC capacity unit, wherein the ADC capacity unit is an atomic and indivisible grouping of a predefined portion of the hardware resources, and wherein different integral multiples of the ADC capacity unit are allocated to each of at least two vADCs of the plurality; and
   distribute incoming traffic to one of the plurality of vADCs and schedule execution of the plurality of vADCs on the plurality of core processors, wherein each of the plurality of vADCs is independently executed on at least one of the plurality of core processors based on the integral multiple of ADC capacity units allocated for the vADC.

2. The virtualized application delivery controller device of claim 1, wherein each of the plurality of vADCs performs network processing tasks of a physical ADC device, wherein each vADC performs a network processing task independently of other vADCs of the plurality of vADCs.

3. The virtualized application delivery controller device of claim 1, wherein the virtualized application delivery controller device is a physical computing device including any one of: a server, a blade server, a multi-blade device, and a network device.

4. The virtualized application delivery controller device of claim 1, wherein a single operating system is executed on the hardware layer and wherein each of the plurality of vADCs does not execute its own guest operating system.

5. The virtualized application delivery controller device of claim 1, wherein each of the plurality of vADCs is exposed to the communication network as a separate network device having at least one of: a networking configuration, a medium access control (MAC) address, and an application delivery configuration separated and different from other vADCs of the plurality of vADCs.

6. The virtualized application delivery controller device of claim 1, wherein the each vADC of the plurality of vADCs is configured with a set of internal ports associated with a set of external ports of the virtualized application delivery controller device, wherein the association between the set of internal ports and the set of external ports is any one of a dedicated port topology and a shared port topology.

7. The virtualized application delivery controller device of claim 1, wherein the device is configured to distribute the incoming traffic based on at least a type of the association between the set of internal ports and the set of external ports and at least one of a MAC address, a physical port number, and a VLAN tag designated in the incoming traffic.

8. The virtualized application delivery controller device of claim 7, wherein the device is further configured to clone packets in the incoming traffic and to send the cloned packets to multiple destinations, wherein packets of the incoming traffic include any one of broadcast packets, multicast packets, and packets with an unknown destination MAC address.

9. The virtualized application delivery controller device of claim 1, wherein the device is further configured to:
   route traffic between at least two of the plurality of vADCs; and
   select one or more of the plurality of core processors to execute a vADC from the plurality of vADCs based at least on internet protocol (IP) parameters in the incoming traffic.

10. The virtualized application delivery controller device of claim 1, wherein the device is further configured to schedule the execution of the plurality of vADCs on one core processor of the plurality of core processors by:
dividing a guaranteed latency time to a predefined number of time slices, wherein each time slice is a minimum time period that a vADC can utilize the one core processor; and
allowing each vADC to utilize the one core processor for a consecutive number of time slices determined by the integral multiple of ADC capacity units allocated to the vADC, wherein each vADC executed on the one core processor can access the one core processor every time period that at most is equal to the guaranteed latency time.

11. The virtualized application delivery controller device of claim 10, wherein the device is further configured to allocate to each of the plurality of vADCs at least one ADC capacity unit.

12. The virtualized application delivery controller device of claim 11, wherein the hardware resource parameters include at least one processor core, or a portion thereof, a percentage of a throughput of the network interface, and percentage of the amount of the memory.

13. The virtualized application delivery controller device of claim 12, wherein the hardware resources further include at least one of: a number of concurrent connections, new connections per second, storage space on a storage device, a number of secure sockets layer (SSL) connections, a compression throughput capacity to process the incoming traffic, a number virtual IP addresses, a real IP address, and a proxy IP address.

14. The virtualized application delivery controller device of claim 11, wherein one or more ADC capacity units can be dynamically allocated or de-allocated to a vADC during the execution of the vADC.

15. A method for visualizing an application delivery controller, comprising:
instancing a plurality of virtual application delivery controllers (vADCs), the plurality of vADCs being executed on a hardware infrastructure of a computing device, the hardware infrastructure includes at least a memory, a plurality of core processors, and a network interface,
wherein each of the plurality of vADCs is allocated a portion of hardware resources provided by the hardware infrastructure, the portion of the hardware resources allocated to each respective vADC being an integral multiple of an ADC capacity unit, wherein ADC capacity unit is an atomic and indivisible block grouping of a predefined portion of the hardware resources, and wherein different integral multiples of the ADC capacity unit are allocated to each of at least two vADCs of the plurality;
distributing incoming traffic to the plurality of vADCs; and
scheduling execution of the plurality of vADCs on the plurality of core processors, wherein each of the plurality of vADCs is independently executed on at least one of the plurality of core processors based on the integral multiple of ADC capacity units allocated for the vADC.

16. The method of claim 15, wherein each of the plurality of vADC performs network processing tasks of a physical ADC device, wherein each vADC performs a network processing task independently of other vADCs of the plurality of vADCs.

17. The method of claim 15, wherein each of the plurality of vADCs is exposed to the communication network as a separate network device having at least one of: a networking configuration, a medium access control (MAC) address, and an application delivery configuration separated and different from other vADCs of the plurality of vADCs.

18. The method of claim 17, wherein each vADC of the plurality of vADCs is configured with a set of internal ports associated with a set of external ports of the computing device, wherein the association between the set of internal ports and the set of external ports is based on any one of a dedicated port topology and a shared port topology.

19. The method of claim 18, wherein distributing the incoming traffic further comprises:
selecting one of the plurality vADCs to process packets related to a particular stream of the incoming traffic, wherein the selection is based on at least a type of the association between the set of internal ports and the set of external ports and at least one of a MAC address, a physical port number, and a VLAN tag designated in the incoming traffic.

20. The method of claim 19, further comprising:
checking if the association type is any one of the dedicated port topology and the shared port topology;
checking if an external port is bound to a designated vADC, when the association type is the dedicated port topology;
selecting the designated vADC to process the packets, when the external port is bound to the designated vADC;
selecting a vADC to process the packets by matching a VLAN tag embedded in the packets to a VLAN-to-vADC translation table, when the external port is not bound to the designated vADC;
checking if the packets are broadcast packets, when the association type is the shared port topology;
selecting a vADC to process the packets by matching a destination MAC address of the packets to a MAC-to-vADC translation table, when the packets are not broadcast packets; and
selecting one or more vADCs to process the packets by matching a destination MAC address of the packets to a VLAN-to-vADC translation table, when the packets are broadcast packets, wherein the packets are cloned as the number of vADCs returned by matching.

21. The method of claim 20, further comprises:
selecting one or more of the plurality of core processors to execute the selected vADC based on at least IP parameters in the packets.

22. The method of claim 15, wherein scheduling the execution of the plurality of vADCs on the plurality of core processors further comprises scheduling the execution of the plurality of vADCs on one core processor of the plurality of core processors by:
dividing a guaranteed latency time into a predefined number of time slices, wherein each time slice is a minimum time period that a vADC can utilize the one core processor; and
allowing each vADC to utilize the one core processor for a consecutive number of time slices determined by the integral multiple ADC capacity units allocated to the vADC, wherein each vADC executed on the one core processor can access the one core processor every time period that at most equals to the guaranteed latency time.

23. The method of claim 22, further comprising:
allocating to each of the plurality of vADCs at least one ADC capacity unit.

24. The method of claim 18, further comprising:
routing packets processed by one of the plurality of vADCs to any one of an external port and another vADC, a destination of the packets is based on at least a type of the association between the set of internal ports and the set of external ports and at least one of a destination MAC address, a physical port number, and a VLAN tag of the processed packets.

25. A system configured to provide virtualized application delivery control services, comprising:
a plurality of blade servers, each of the plurality of blade servers includes a hardware interface having at least a plurality of core processors, a memory, and a network interface, wherein each of the plurality of blade servers is configured to create a plurality of virtual application delivery controllers (vADCs), the plurality of vADCs are executed on the hardware infrastructure of the blade server, wherein each of the plurality of vADCs is allocated a portion of hardware resources of the hardware infrastructure of its respective blade server, the portion of the hardware resources allocated to each respective vADC being an integral multiple of an ADC capacity unit, wherein the ADC capacity unit is an atomic and indivisible grouping of a predefined portion of the hardware resources, and wherein different integral multiples of the ADC capacity unit are allocated to each of at least two vADCs of the plurality; and
a switch connected to the plurality blade servers, wherein the switch is configured to distribute an incoming traffic to one of the plurality of blade servers for processing by one of the vADCs executed thereon.

26. The system of claim 25, wherein the switch is configured to select one of the blade servers to distribute the incoming traffic to, wherein the selection is based on at least an association between input ports of the switch and physical ports of each of the blade server and association between internal ports of each vADC and the physical ports of each of the blade servers.

27. The system of claim 25, wherein each blade server is further configured to:
distribute incoming traffic to the plurality of vADCs executed thereon; and
schedule execution of the plurality of vADCs on the plurality of core processors, wherein each of the plurality of vADCs is independently executed on at least one of the plurality of core processors based on the integral multiple of ADC capacity units allocated for the vADC.

* * * * *